(12) United States Patent
Wang

(10) Patent No.: US 11,383,733 B2
(45) Date of Patent: Jul. 12, 2022

(54) METHOD AND SYSTEM FOR DETECTING A DANGEROUS DRIVING CONDITION FOR A VEHICLE, AND NON-TRANSITORY COMPUTER READABLE MEDIUM STORING PROGRAM FOR IMPLEMENTING THE METHOD

(71) Applicant: MiTAC Digital Technology Corporation, Taoyuan (TW)

(72) Inventor: Wei-Chung Wang, Taoyuan (TW)

(73) Assignee: MiTAC Digital Technology Corporation, Taoyuan (TW)

(*) Notice: Subject to any disclaimer, the term of this patent is extended or adjusted under 35 U.S.C. 154(b) by 0 days.

(21) Appl. No.: 17/162,076

(22) Filed: Jan. 29, 2021

(65) Prior Publication Data
US 2021/0237758 A1     Aug. 5, 2021

(30) Foreign Application Priority Data

Jan. 31, 2020 (TW) .................................. 109103109
Nov. 10, 2020 (TW) .................................. 109139160

(51) Int. Cl.
*H04N 7/18* (2006.01)
*B60W 50/14* (2020.01)
(Continued)

(52) U.S. Cl.
CPC .......... *B60W 50/14* (2013.01); *B60W 40/105* (2013.01); *G06V 20/588* (2022.01);
(Continued)

(58) Field of Classification Search
CPC ............... B60W 50/14; B60W 40/105; B60W 2050/143; B60W 2050/146; B60W 2554/4046; B60W 2556/10; G06V 20/588
See application file for complete search history.

(56) References Cited

U.S. PATENT DOCUMENTS 6,373,400 B1 * 4/2002 Fujita ..................... B60K 35/00
                                                       340/904
8,269,652 B2 * 9/2012 Seder ..................... G02B 27/01
                                                       340/436
(Continued)

FOREIGN PATENT DOCUMENTS

CN       104246850 A     12/2014
CN       109353343 A     2/2019
(Continued)

OTHER PUBLICATIONS

Search Report appended to an Office Action, which was issued to Taiwanese counterpart application No. 109139160 by the TIPO dated Apr. 20, 2021, with an English translation thereof.

*Primary Examiner* — Munear T Akki
(74) *Attorney, Agent, or Firm* — Hammer & Associates, P.C.

(57) ABSTRACT

A method for detecting a dangerous driving condition for a vehicle is provided. A camera device is used to capture a moving image of surroundings of the vehicle, and the moving image has at least one target object therein and is defined with a caution region. A processing unit is used to determine, based on the moving image, whether a number of times the at least one target object in the moving image weaves in and out of the caution region satisfies a caution condition, and to control a notification device to output a warning notification to notify a driver of the vehicle that the vehicle is in a dangerous driving condition upon determining that the caution condition is satisfied.

13 Claims, 4 Drawing Sheets

(51) Int. Cl.
    *B60W 40/105*   (2012.01)
    *G06V 20/56*    (2022.01)
(52) U.S. Cl.
    CPC . *B60W 2050/143* (2013.01); *B60W 2050/146* (2013.01); *B60W 2554/4046* (2020.02); *B60W 2556/10* (2020.02)

(56) References Cited

U.S. PATENT DOCUMENTS

| | | | |
|---|---|---|---|
| 8,466,806 | B2 | 6/2013 | Schofield |
| 9,280,901 | B2* | 3/2016 | Chen ................. G08G 1/167 |
| 2006/0173611 | A1* | 8/2006 | Takagi ............. G01C 21/3655 |
| | | | 701/538 |
| 2007/0106475 | A1* | 5/2007 | Kondoh ................ G06V 20/58 |
| | | | 340/436 |
| 2009/0112389 | A1* | 4/2009 | Yamamoto ............... B60R 1/00 |
| | | | 701/31.4 |
| 2012/0050489 | A1 | 3/2012 | Gupta et al. |
| 2012/0123613 | A1* | 5/2012 | Waki .................... G08G 1/166 |
| | | | 701/1 |
| 2012/0154591 | A1* | 6/2012 | Baur ....................... B60R 1/08 |
| | | | 348/148 |
| 2014/0043482 | A1* | 2/2014 | Chiu .................... G08G 1/166 |
| | | | 348/148 |
| 2014/0285364 | A1* | 9/2014 | Chen .................... G08G 1/167 |
| | | | 340/988 |
| 2018/0025636 | A1* | 1/2018 | Boykin ................. B60W 50/14 |
| | | | 701/1 |
| 2018/0257647 | A1* | 9/2018 | Jurca ..................... G01S 13/931 |
| 2019/0035277 | A1* | 1/2019 | Son ........................ G08G 1/163 |
| 2019/0172345 | A1 | 6/2019 | Lin et al. |
| 2020/0039508 | A1* | 2/2020 | Onishi ................... G08G 1/166 |
| 2020/0064850 | A1 | 2/2020 | Hong et al. |
| 2021/0027630 | A1* | 1/2021 | Fan ....................... G08G 1/166 |

FOREIGN PATENT DOCUMENTS

| | | |
|---|---|---|
| CN | 107161081 B | 6/2019 |
| CN | 109919074 A | 6/2019 |
| CN | 110197119 A | 9/2019 |
| JP | 2972479 B2 | 11/1999 |
| JP | 2009099062 A | 5/2009 |
| JP | 2011150573 A | 8/2011 |
| KR | 20120106691 A | 9/2012 |
| TW | I359758 B1 | 3/2012 |
| TW | 201310403 A1 | 3/2013 |
| TW | I577589 B | 4/2017 |

* cited by examiner

METHOD AND SYSTEM FOR DETECTING A DANGEROUS DRIVING CONDITION FOR A VEHICLE, AND NON-TRANSITORY COMPUTER READABLE MEDIUM STORING PROGRAM FOR IMPLEMENTING THE METHOD

CROSS-REFERENCE TO RELATED APPLICATION

This application claims priority of Taiwanese Invention Patent Application Nos. 109103109 and 109139160, filed on Jan. 31 and Nov. 10, 2020, respectively.

FIELD

The disclosure relates to a method for detecting a dangerous driving condition for a vehicle.

BACKGROUND

In recent years, more and more people have their own vehicles (such as cars or motorcycles). However, in view of the increasing density of vehicles on the road, drivers with poor driving behavior pose increasingly great threat to the safety of surrounding vehicles. Therefore, how to detect dangerous driving behaviors and alert drivers appropriately is a topic in the relevant industry.

SUMMARY

Therefore, an object of the disclosure is to provide a method that can detect a dangerous driving condition for a vehicle.

According to the disclosure, the method is implemented by a system that is mounted to the vehicle and that includes a camera device, a processing unit and a notification device. The method includes steps of: by the camera device, capturing a moving image of surroundings of the vehicle, wherein the moving image has at least one target object therein; by the processing unit, defining a caution region in the moving image; by the processing unit, determining, based on the moving image, whether a number of times the at least one target object in the moving image weaves in and out of the caution region satisfies a caution condition; and by the processing unit, controlling the notification device to output a warning notification that is perceivable to a driver (in vision and/or hearing) of the vehicle to notify the driver that the vehicle is in a dangerous driving condition when the processing unit determines that the caution condition is satisfied.

Another object of the disclosure is to provide the system that implements the method.

According to this disclosure, the system includes a camera device, a notification device and a processing unit. The camera device is to be mounted to the vehicle, and is configured to capture a moving image of surroundings of the vehicle. The moving image has at least one target object therein. The notification device is configured to output messages that are perceivable to a driver of the vehicle. The processing unit is electrically connected to the camera device and the notification device, and is configured to cooperate with the camera device and the notification device to perform the method of this disclosure.

Yet another object of the disclosure is to provide a computer program product.

According to this disclosure, the computer program product is realized as a non-transitory computer readable medium that stores a program causing the system of this disclosure to, when the program is executed by the processing unit of the system, perform the method of this disclosure.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
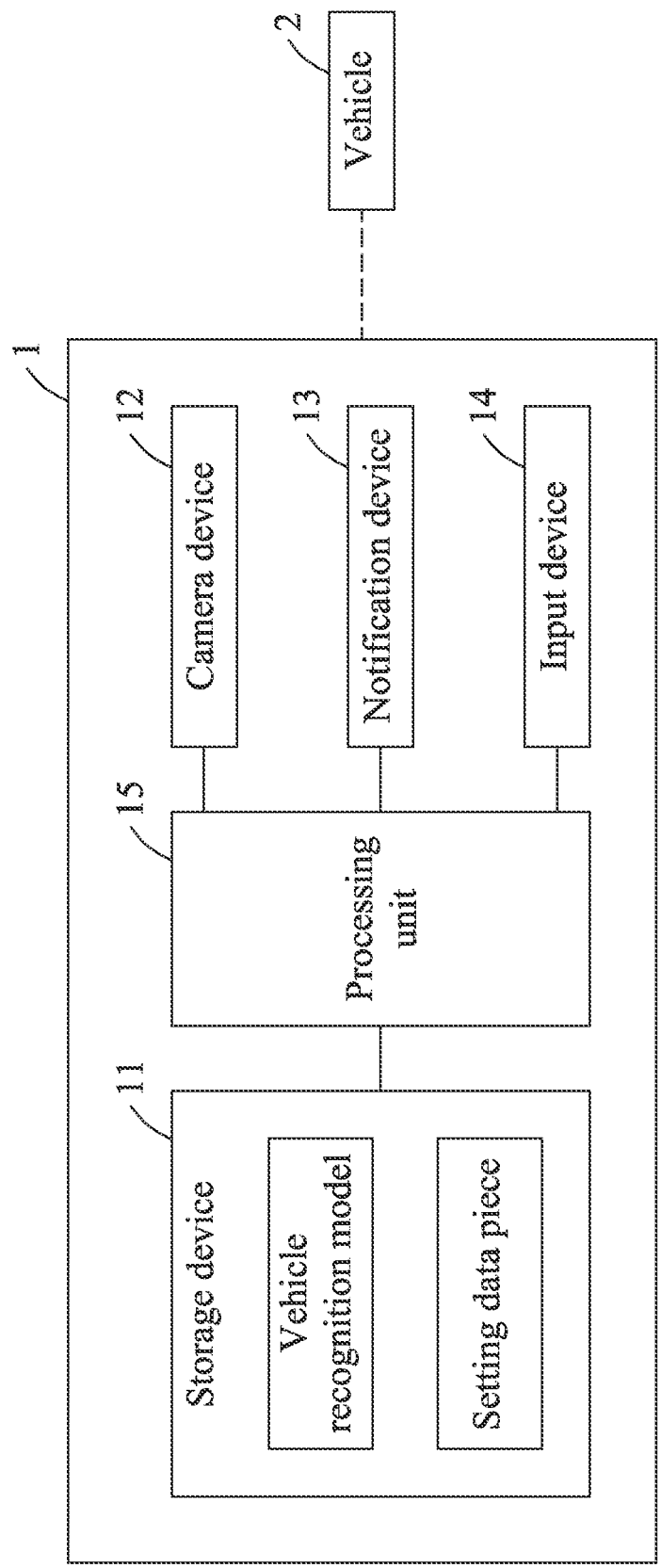
FIG. 1 is a block diagram exemplarily illustrating a system according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics. The "electrical connection" mentioned in this patent specification refers to a wired electrical connection between multiple electronic devices/devices/components through the connection of conductive materials, and a wireless electrical connection through wireless communication technology for wireless signal transmission. In addition, the "electrical connection" mentioned in this patent specification also refers to the "direct electrical connection" formed by the direct connection between two electronic devices/devices/components, and the "indirect electrical connection" formed by the connection between two electronic devices/devices/components through other electronic devices/devices/components.

Referring to FIG. 1, a system 1 that is adapted to implement a first embodiment of a method for detecting a dangerous driving condition for a vehicle 2 according to this disclosure is exemplarily shown to include a storage device 11, a camera device 12, a notification device 13, an input device 14, and a processing unit 15 that is electrically connected to the storage device 11, the camera device 12, the notification device 13 and the input device 14. In some embodiments, the system 1 may be realized as an event data recorder (EDR) system that can be manufactured and sold as an individual unit, and that can be installed/mounted to the vehicle and electrically connected to an electronic control unit (ECU) of the vehicle 2. In some embodiments, the system 1 may be realized as a digital video recorder (DVR). In some embodiments, the system 1 may be realized as a driver assistance system that is built within the vehicle 2 before the vehicle 2 leaves its manufacturing facility. However, this disclosure is not limited in this respect.

In this embodiment, the storage device 11 may be a memory module that stores digital data, such as a vehicle recognition model and a setting data piece for use by the system 1. The vehicle recognition model can be obtained by using a machine learning algorithm to train a neural network model for recognizing vehicles, such that the processing unit 15 can, when executing the vehicle recognition model, perform image recognition on a still image or a moving image (i.e., a picture or a video), and identify the vehicle(s) in the image, if any, by, for example, edge detection or feature identification, but this disclosure is not limited in this respect. It is noted that this disclosure does not focus on the techniques of building the vehicle recognition model, and the vehicle recognition model may be realized using other conventional image recognition techniques, and is not limited to those described herein.

In this embodiment, the camera unit 12 may be realized as a camera module that includes a lens set and a photo sensor, that is mounted to the vehicle 2, and that is disposed to face a target side of the vehicle 2 and capture images of the target side. In this embodiment, the target side is a front side of the vehicle 2. In other embodiments, the target side may be a rear side or other sides of the vehicle 2, and this disclosure is not limited in this respect.

In this embodiment, the notification device 13 is configured to output messages that are perceivable to a driver of the vehicle 2, and may be realized to include a speaker and/or a display. The input device 14 may be realized to include multiple press buttons. In some embodiments, the input device 14 may be integrated with the notification device 13 to form a touch screen display. In some embodiments, the notification unit 13 may be realized as a connection port and/or a wireless communication module (e.g., a Bluetooth module) that is capable of connection to speakers of the vehicle 2. However, the notification device 13 and the input device 14 are not limited to those described herein.

In case the system 1 is realized as an EDR system or a DVR, the processing unit 15 may be realized as a processor or a control circuit board in the EDR system or the DVR. In case the system 1 is realized as a driver assistance system that is built in the vehicle 2, the processing unit 15 may be realized as an ECU of the vehicle 2. However, this disclosure is not limited in this respect.

In this embodiment, the vehicle 2 is exemplified as a sedan however, the system 1 may also be applicable to other types of vehicles, such as motorcycles, trucks, buses, etc., and this disclosure is not limited in this respect.

Figure 2:
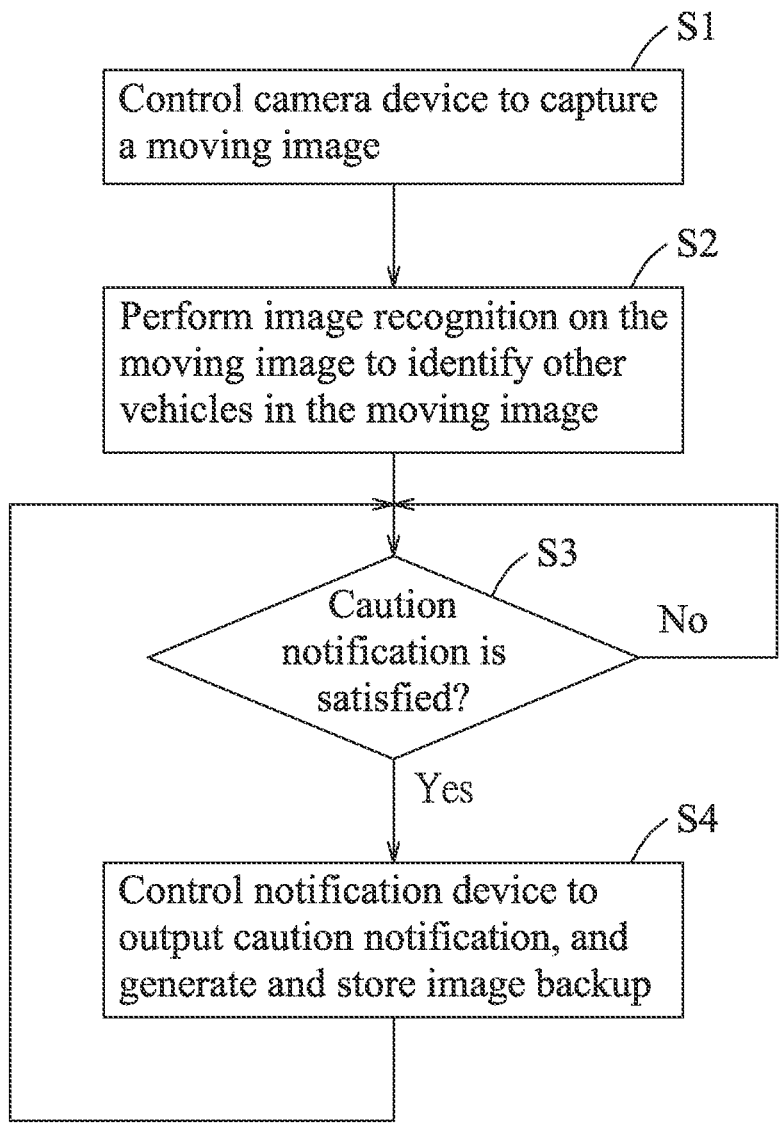
FIG. 2 is a flow chart illustrating steps of a first embodiment of the method for detecting a dangerous driving condition for a vehicle according to this disclosure.

Further referring to FIG. 2, the first embodiment is shown to include steps S1-S4.

Figure 3:
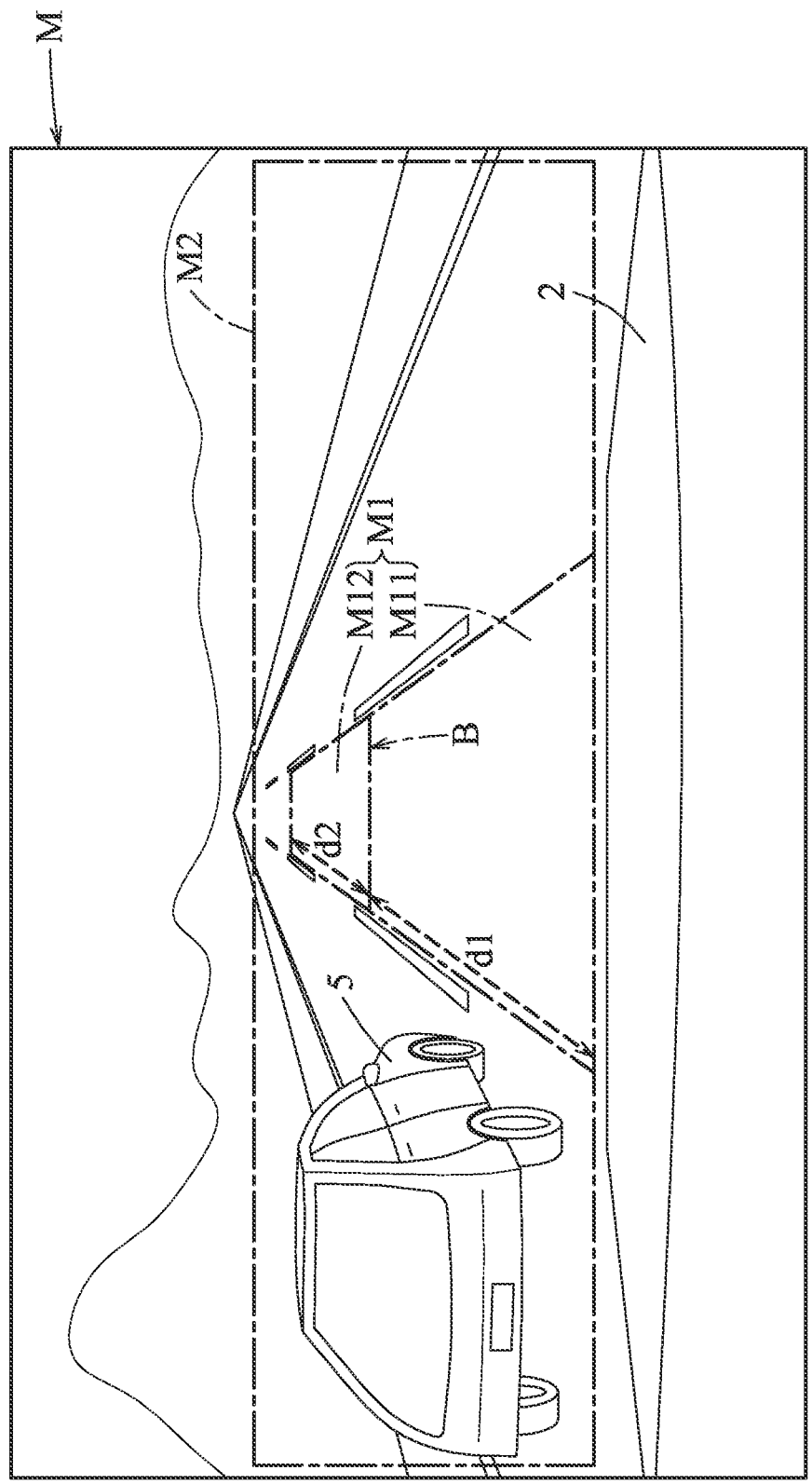
FIG. 3 is a schematic diagram illustrating a moving image captured by the system.

Further referring to FIG. 3, in step S1, the processing unit 15 controls the camera device 12 to capture a moving image (14) of surroundings of the vehicle 2 at a target side of the vehicle 2, so the moving image (M) shows a target environment at the target side of the vehicle 2. In practice, the moving image (M) is a real-time video recorded by the camera device 12 and is composed of multiple frames, while FIG. 3 shows only one of the frames of the moving image (M). In this embodiment, the camera device 12 captures pictures of a front side (target side) of the vehicle 2, so the moving image (M) shows an environment in front of the vehicle 2 (target environment) and a part of a front portion of the vehicle 2.

Figure 4:
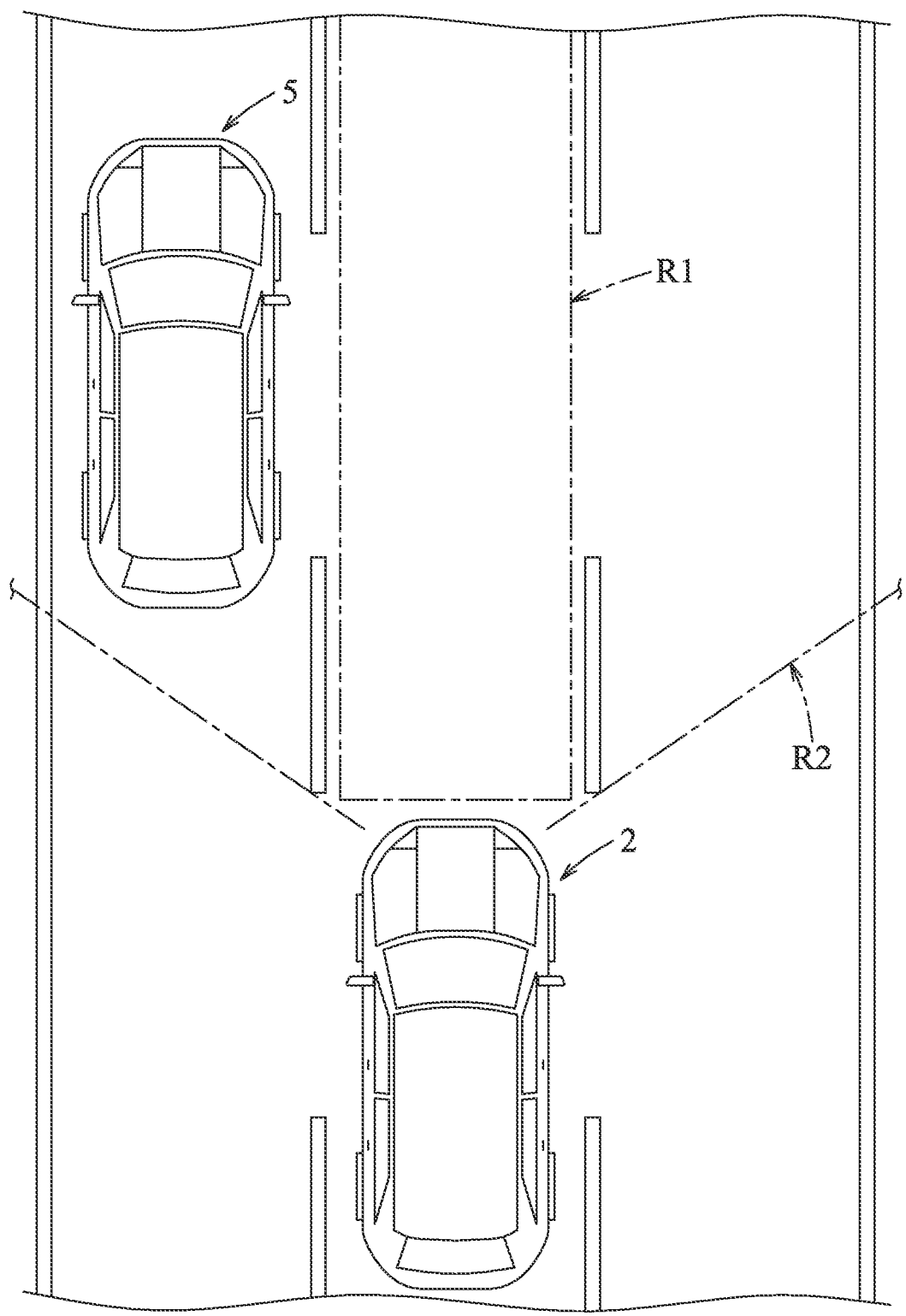
FIG. 4 is a schematic diagram illustrating a scene that corresponds to the moving image as shown in FIG. 3.

In this embodiment, the processing unit 15 defines a caution region (M1) and a monitoring region (M2) in the moving image (M), and the monitoring region (M2) is connected to a left side, a right side and an upper side of the caution region (M1). In some embodiments, the monitoring region may completely surround the caution region, and this disclosure is not limited in this respect. In this embodiment, the caution region (M1) is shaped as a trapezoid with an upper portion narrower than a lower portion thereof, and thus corresponds to a rectangular first area (R1) in front of the vehicle 2 in the real world, as shown in FIG. 4. The monitoring region (M2) cooperates with the caution region (M1) to define a second area (R2) that is shaped as a sector in the real world, as shown in FIG. 4 (i.e., the monitoring region M2 corresponds to an area of (R2-R1) in the real world. The second area (R2) as a central angle related to a field of view of a lens unit of the camera device 12. Specifically, the central angle of the second area (R2) is equal to or smaller than the field of view of the lens unit of the camera device 12. Considering that distortion usually occurs at edge portions of an image, the monitoring region (M2) can be defined so that the central angle of the second area (R2) is smaller than the field of view of the lens unit of the camera device 12. However, this disclosure is not limited in this respect.

In this embodiment, the processing unit 15 further defines a first sub-region (M11) and a second sub-region (M12) in the caution region (M1). The first sub-region (M11) is adjacent to (or in connection with) the second sub-region (M12) at a lower side of the second sub-region (M12), which means that a first area of the target environment shown in the first sub-region (M11) is closer to the vehicle 2 than a second area of the target environment shown in the second sub-region (M12) in the real world. In FIG. 3, a distance between a top side and a bottom side of the first sub-region (M11) (i.e., the maximum height of the first sub-region (M11)) corresponds to a first distance (d1) in the real world, and a distance between a top side and a bottom side of the second sub-region (M12) (i.e., the maximum height of the second sub-region (M12)) corresponds to a second distance (d2) in the real world. As an example, when the processing unit 15 sets the first distance (d1) and the second distance (d2) to be 15 meters and 20 meters, respectively, the first area in the real world that corresponds to the first sub-region (M11) is an area within 15 meters ahead of the vehicle 2, and the second area in the real world that corresponds to the first sub-region (M11) is an area from 15 meters ahead of the vehicle 2 to 35 meters ahead of the vehicle 2. However, this disclosure is not limited to the settings as exemplified above.

In this embodiment, the setting data piece that is stored in the storage device 11 may contain multiple setting parameters that cooperatively define properties, such as shape, size, position, etc., of the caution region (M1) in the moving image (M), and the processing unit 15 defines the shape, size and position of the caution region (M1) in the moving image (14) according to the setting data piece. In this embodiment, the shape, size and position of the caution region (M1) in the moving image (M) are fixed unless the setting data piece is edited by a user to change the setting parameters. In some embodiments, the setting parameters may include the first distance (d1) and the second distance (d2).

When the system 1 is not performing the method according to this disclosure, the user may use the input device 14 to edit the setting data piece, so as to adjust the shape, size and position of the caution region (M1) in the moving image (M), making the caution region (M1) correspond to a desired environment that is defined relation to the vehicle 2 (e.g., the environment in front of the vehicle 2).

In some embodiments, the processing unit 15 may determine/define the caution region (M1) in the moving image (M) based on a plurality of road surface markings in the moving image (M). For example, the processing unit 15 may determine the caution region (M1) using two lane markings and a vanish point defined by extensions of the two lane markings. In other words, the shape, size and position of the caution region (M1) are determined by the processing unit 15 performing real-time computation on the moving image (M), and may dynamically change with changes in the moving image (M). Accordingly, there are various ways to define the caution region (M1), and this disclosure is not limited to those described herein.

In some embodiments, the monitoring region (M2) can also be predefined in the setting data piece for use by the processing unit 15. In some embodiments, the processing unit 15 may define the monitoring region (M2) in real time by performing road surface recognition on the moving image (M). This disclosure is not limited to methods of defining the monitoring region (M2), and the shape of the monitoring region (M2) is not limited to that exemplified in FIG. 3.

In step S2, the processing unit uses the vehicle recognition model to continuously perform image recognition on the moving image (M), so as to identify vehicles (such as motorcycles, sedans, buses, trucks, etc.) other than the vehicle 2 in the moving image (M). In more detail, the processing unit 15 continuously determines whether there is an object entering a combined region constituted by the monitoring region (M2) and the caution region (M1) from outside of the combined region. Upon determining that at least a part of an object has entered the combined region, the processing unit 15 uses the vehicle recognition model to determine whether the object is a vehicle. When determining that the object is a vehicle, the processing unit 15 marks the object, making the object become a target object for this embodiment. FIGS. 3 and 4 exemplarily show a target object 5 that is a vehicle at a left front side of the vehicle 2. Although FIGS. 3 and 4 and the following description use a single target object 5 for ease of explanation, it is noted that the moving image (M) may include one or more vehicles in the combined region that serve as one or more target objects. It should be noted that, in one embodiment, an object outside of the combined region cannot serve as a target object, and so when a target object is determined to have left the combined region, the processing unit 15 would unmark this object so that it is no longer considered a target object by the processing unit 15.

After the target object 5 is identified, the flow goes to step S3. In step S3, the processing unit 15 determines, based on the moving image (M), whether a number of times the target object 5 in the moving image (M) weaves in and out of the caution region (M1) (e.g., entering, and then leaving the caution region (M1)) satisfies a caution condition. The flow goes to step S4 when the determination is affirmative, and repeats step S3 when otherwise. In this embodiment, the caution condition includes a first condition and a second condition, and the processing unit 15 determines that the caution condition is satisfied when any one of the first and second conditions is met.

In this embodiment, the first condition is related to a number of times the target object 5 in the moving image (M) weaves in and out of the first sub-region (M11) (e.g., entering, and then leaving the first sub-region (M11)), and a second condition is related to a number of times the target object 5 in the moving image (M) weaves in and out of the second sub-region (M12) (e.g., entering, and then leaving the second sub-region (M12)). In more detail, the first condition includes that the number of times the target object 5 in the moving image (M) weaves in and out of the first sub-region (M11) within a predetermined period of time reaches a first threshold number, the second condition includes that the number of times the target object 5 in the moving image (M) weaves in and out of the second sub-region (M12) within the predetermined period of time reaches a second threshold number, and the first threshold number is smaller than the second threshold number.

As an example, the predetermine period of time may be set as six seconds, the first threshold number may be set as two, and the second threshold number may be set as three. Once the processing unit 15 determines, based on the moving image (M), that the target object 5 weaves in and out of the first sub-region (M11) two or more times within six seconds, or that the target object 5 weaves in and out of the second sub-region (M12) three or more times within six seconds, the processing unit 15 determines that the caution condition is satisfied. It is noted that the first threshold number and the second threshold number may be set as desired, and this disclosure is not limited in this respect.

In more detail, when the processing unit 15 finds that an arbitrary part. (e.g., an edge) of the target object 5 has entered the first sub-region (M11), the processing unit 15 may determine that the target object 5 has weaved into the first sub-region (M11); and when the processing unit 15 finds that the target object 5 has completely left the first sub-region (M11) and the entire target object 5 is not within the first sub-region (M11), the processing unit 15 may determine that the target object 5 has weaved out of the first sub-region (M11). In some embodiments, the processing unit 15 may determine that the target object 5 has weaved into the first sub-region (M11) when a predetermined first percentage of the target object has entered the first sub-region (M11), and determine that the target object 5 has weaved out of the first sub-region (M11) when a predetermined second percentage of the target object has left the first sub-region (M11). In some embodiments, the processing unit 15 may determine whether the target object 5 enters or leaves the first sub-region (M11) by determining whether characterized part (e.g., a vehicle registration plate, a wheel, etc.) of the target object 5 enters or leaves the first sub-region (M11). In other words, the processing unit 15 may determine whether the target object 5 enters or leaves the first sub-region (M11) in various ways, and this disclosure is not limited in this respect.

The ways the processing unit 15 determines the number of times the target object 5 weaves in and out of the second sub-region (M12) and determines whether the target object 5 enters or leaves the second sub-region (M12) are similar to those described with respect to the first sub-region (M11), so details thereof are omitted herein for the sake of brevity.

In step S4, the processing unit. 15 controls the notification device 13 to perceivably (e.g., visually and/or audibly) output a warning notification to notify the driver of the vehicle 2 that the vehicle 2 or other surrounding vehicle(s) is in a dangerous driving condition. In addition, the processing unit 15 may optionally perform a backup procedure to generate an image backup that records a travel route of the target object 5, and to store the image backup in the storage device 11 and/or a cloud server. The image backup can serve as evidence when an accident occurs, thereby protecting rights and interests of the driver.

In some embodiments, the processing unit 15 may control a speaker of the notification device 13 to audibly output the warning notification in a form of a siren. In some embodiments, the notification device 13 may be realized as a connection port or a wireless communication module, and the processing unit 15 controls the notification device 13 to output the warning notification via a speaker of the vehicle 2. In some embodiments, the processing unit 15 may control a display of the notification device 13 to visually output the warning notification in a text form or using a pattern. In some embodiments, the notification device 13 may be realized as a connection port or a wireless communication module, and the processing unit 15 controls the notification device 13 to output the warning notification via a display of the vehicle 2. However, the ways for outputting the warning notification are not limited to those described herein.

The processing unit 15 may generate the image backup by truncating a part of the moving image (N) to generate the image backup. In some embodiments, the image backup may start from a frame where the target object 5 just entered the monitoring region (M2), and end at a frame that is twenty seconds later than a time point at which the processing unit 15 determines that the caution condition is satisfied. However, as long as the image backup can show the travel route of the target object 5 that makes the processing unit 15 determine that the caution condition is satisfied (i.e., the target object 5 is the reason of the caution condition being satisfied), this disclosure is not limited to a specific way of generating the image backup.

After the processing unit 15 controls the notification device 13 to output the warning notification and performs the backup procedure, the flow goes back to step S3, but this disclosure is not limited thereto. In a simplified embodiment, step 4 may only include the processing unit 15 controlling the notification device 13 to output the warning notification, without the backup procedure.

According to the first embodiment, the processing unit 15 determines that the caution condition is satisfied when the target object 5 (i.e., another vehicle) repeatedly weaves in and out of the caution region (M1) in the moving image (M) within the predetermined period of time. Such determination may result from zigzag driving of the target object 5 or the vehicle 2 itself, which may compromise the driving safety, so the processing unit 15 controls the notification device 13 to output the warning notification to actively advise the driver that the surrounding vehicle(s) or the vehicle 2 itself may be in a dangerous driving condition.

According to the first embodiment, in the case that the shape, size and position of the caution region (M1) in the moving image (M) are defined using the setting data piece, computation load of the processing unit 15 may be reduced in comparison to using the road surface markings to define the caution regions (M1) in the moving image (M) because the identification of the road surface markings is not required. Furthermore, such implementation is applicable to various driving environments, and is not limited by the road surface markings.

According to the first embodiment, the first threshold number is smaller than the second threshold number. In other words, the processing unit 15 has higher sensitivity for the first sub-region (M11) than for the second sub-region (M12). In the real world, the first area that corresponds to the first sub-region (M11) is closer to the vehicle 2 than the second area that corresponds to the second sub-region (M12), so the system 1 is configured to monitor the first sub-region (M11) using a stricter standard. In some embodiments, the caution region (M1) may be divided into multiple sub-regions that are given different notification-triggering standards based on different risk levels for the vehicle 2.

When the target side is the rear side of the vehicle 2 (i.e., the camera device 12 captures the moving image at the rear side of the vehicle 2), the system 1 can also achieve similar effects.

A second embodiment of the method for detecting a dangerous driving condition for the vehicle 2 is different from the first embodiment in that, in step S4, when the processing unit 15 determines that the caution condition is satisfied, the processing unit 15 may further determine whether the satisfaction of the caution condition resulted from the movement of the vehicle 2 itself or from the movement of the target object 5. In some embodiments, the processing unit 15 determines in real time, based on variation of the road surface markings (e.g., lane markings) in the moving images (M), whether the satisfaction of the caution condition was caused by the movement of the vehicle 2 itself. In more detail, the processing unit 15 determines whether the vehicle 2 frequently changes lanes based on variations in angles between a heading direction of the vehicle 2 (i.e., a direction in front of the vehicle 2 is facing) and the lane markings, so as to determine whether the satisfaction of the caution condition resulted from the movement of the vehicle 2 itself. In some embodiments, the system 1 may further include a gravity sensor device (e.g., an accelerometer, a gyroscope, a combination of an accelerometer and a gyroscope, etc.), and the processing unit 15 determines in real time, based on a variation of the gravity sensed by the gravity sensor device, whether the vehicle 2 frequently sways or changes its heading direction, so as to determine whether the satisfaction of the caution condition resulted from the movement of the vehicle 2 itself. Upon determining that the satisfaction of the caution condition resulted from the movement of the vehicle 2 itself, the processing unit 15 controls the notification device 13 to output a first notification that serves as the warning notification and that notifies the driver of the vehicle 2 to drive in a safe way (e.g., a verbal announcement of "Please maintain stable driving", but this disclosure is not limited to such). Upon determining that the satisfaction of the caution condition did not result from the movement of the vehicle 2 itself, which means that the satisfaction of the caution condition was caused by another vehicle, the processing unit 15 controls the notification device 13 to output a second notification that serves as the warning notification, that is different from the first notification, and that notifies the driver of the vehicle 2 that a nearby vehicle is being driven in a dangerous manner. As an example, the second notification may be a siren, but this disclosure is not limited to such.

A third embodiment of the method for detecting a dangerous driving condition for the vehicle 2 according to this disclosure is different from the first embodiment that the processing unit 15 dynamically adjusts the sizes of the first sub-region (M11) and the second sub-region (M12) based on variation in a moving speed of the system 1 (substantially equaling variation of a speed of the vehicle 2). The speed of the vehicle 2 may be obtained from a global positioning system (GPS) continuously acquiring positional coordinates of the vehicle 2 at different time points, and/or an on-board diagnostic (OBD) device of the vehicle 2. In some embodiments, since lane markings usually have a fixed length, the processing unit 15 may estimate the speed of the vehicle 2 by using the moving images to calculate a number of lane markings the vehicle 2 has passed within a time period. The processing unit 15 may adjust the sizes of the first sub-region (M11) and the second sub-region (M12) by making the size of the first sub-region (M11) positively correlated to the speed of the vehicle 2 (i.e., the faster the vehicle 2 is moving, the larger the first sub-region (M11)), and making the size of the second sub-region (M12) negatively correlated to the speed of the vehicle 2 (i.e., the faster the vehicle 2 is moving, the smaller the second sub-region (M12)).

In detail, a sum of the first distance (d1) and the second distance (d2) is constant (i.e., an area of the caution region (M1) is fixed) in the third embodiment. Assuming that the vehicle 2 in FIG. 3 travels at a speed of 60 km/h, when the vehicle 2 accelerates from the speed of 60 km/h, the processing unit 15 may make a border (B) between the first sub-region (M11) and the second sub-region (M12) move upward with respect to FIG. 3, or further away from the vehicle 2, so as to enlarge the first sub-region (M11) (also making the first distance (d1) greater) and shrink the second sub-region (M12) (also making the second distance (d2) smaller). When the vehicle decelerates from the speed of 60 km/h, the processing unit 15 may make the border (B) move downward with respect to FIG. 3, or closer to the vehicle 2, so as to shrink the first sub-region (M11) (also making the first distance (d1) smaller) and enlarge the second sub-region (M12) (also making the second distance (d2) greater). It is noted that the processing unit 15 may adjust the sizes of the first sub-region (M11) and the second sub-region (M12) (i.e., move the border (B)) by changing either the first distance (d1) or the second distance (d2) in the setting data piece.

In other words, in the third embodiment, the processing unit 15 dynamically adjusts the sizes of the first sub-region (M11) and the second sub-region (M12) based on variation in the speed of the vehicle 2 while maintaining the shape, size and position of the caution region (M1) unchanged. Particularly, since the first area in the real world that corresponds to the first sub-region (M11) is closer to the vehicle 2 than the second area in the real world that corresponds to the second sub-region (M12), the first sub-region (M11) has more influence on driving safety for the vehicle 2 in comparison to the second sub-region (M12). Accordingly, the third embodiment enlarges the first sub-region (M11) when the speed of the vehicle increases, so as to detect potential zigzag driving with higher sensitivity.

In some implementations, the first distance (d1) or the second distance (d2) may be determined based on not only a current speed of the vehicle 2 but also a response time that is a length of time required by the driver of the vehicle 2 to brake after the driver becomes aware of danger. The other one of the first distance (d1) and the second distance (d2) can be obtained by subtracting the determined first distance (d1) or second distance (d2) from a predetermined constant.

For example, assuming that the current speed of the vehicle 2 is 72 km/h (i.e., 20 m/s), and the response time is 0.8 seconds, the processing unit 15 would determine the first distance (d1) to be 16 meters (i.e., 20 m/s×0.8 seconds). As a result, the driver of the vehicle 2 may have sufficient time to brake the vehicle 2 upon receipt of the caution notification that is outputted when the caution condition is satisfied.

In some embodiments, the processing unit 15 may determine a length of the response time based on a plurality of previous response time lengths, each of which is an interval between a previous output of the warning notification and an act of braking that was made by the driver in response to the previous output of the warning notification. For example, the processing unit 15 may take an average of fifty previous response time lengths to obtain the response time, but this disclosure is not limited to such. In practice, the processing unit 15 may be electrically connected to a vehicle-mounted electronic device (not shown), so the processing unit 15 can obtain, from the vehicle-mounted electronic device, a braking time point every time the brake of the vehicle 2 is operated. Therefore, the processing unit can acquire, after a caution notification is outputted, the interval between the output of the caution notification and the corresponding braking time point at which a braking action is performed the first time after the output of the caution notification is performed, and makes the interval serve as the latest response time length. In this way, the processing unit 15 can determine an appropriate response time for the driver of the vehicle 2 tailored to the driver. It is noted that the vehicle-mounted electronic device may be, for example, an in-vehicle computer or an on-board diagnostics (OBD) system of the vehicle 2, but this disclosure is not limited in this respect. In this implementation, before the system 1 acquires a sufficient number of the previous response time lengths, a predetermined and fixed time length may be used by the processing unit 15 to serve as the response time. In some embodiments, the system 1 does not acquire the previous response time lengths, and the response time directly set as the predetermined and fixed time length.

A fourth embodiment of the method for detecting a dangerous driving condition for the vehicle 2 is similar to the third embodiment. The fourth embodiment differs from the third embodiment in that the processing unit 15 dynamically adjusts the sizes of the first sub-region (M11) and the second sub-region (M12) based on variation in a total number of the target object(s) 5 in (the combined region. (M1) of) the moving image (M), and the sizes of the first sub-region (M11) and the second sub-region (M12) are adjusted by making the size of the first sub-region (M11) positively correlated to the total number of the target object(s) 5 in the moving image (M) (i.e., the more the target object(s) 5, the larger the first sub-region (M11)), and making the size of the second sub-region (M12) negatively correlated to the total number of the target object(s) 5 in the moving image (M) (i.e., the more the target object(s) 5, the smaller the second sub-region (M12)).

In practice, when a number of the target object(s) 5 in the moving image (M) increases, the processing unit 15 makes the border (B) (see FIG. 3) move upward with respect to FIG. 3, or further away from the vehicle 2, so as to enlarge the first sub-region (M11) and shrink the second sub-region (M12). When a number of the target object (s) 5 in the moving image (M) decreases, the processing unit 15 makes the border (B) (see FIG. 3) move downward with respect to FIG. 3, or closer to the vehicle 2, so as to shrink the first sub-region (M11) and enlarge the second sub-region (M12).

In other words, in the fourth embodiment, the processing unit 15 dynamically adjusts the sizes of the first sub-region (M11) and the second sub-region (M12) based on variation in the number of the target object(s) 5 while maintaining the shape, size and position of the caution region (M1) to be unchanged. As a result, the fourth embodiment enlarges the first sub-region (M11) that has more influence on driving safety for the vehicle 2 when the road condition becomes more congested, making the system 1 have higher sensitivity in detecting potential zigzag driving when the traffic volume is high.

It is noted that, in some implementations, the third embodiment and the fourth embodiment can be combined together, i.e., the processing unit 15 may dynamically adjust the sizes of the first sub-region (M11) and the second sub-region (M12) based on both of the speed of the vehicle 2 and the number of the target object(s) 5 in the moving image (M).

A fifth embodiment of the method for detecting a dangerous driving condition for the vehicle 2 is a simplified version of the first embodiment. The fifth embodiment differs from the first embodiment in that the caution region (M1) is not divided into the first sub-region (M11) and the second sub-region (M12), and the caution condition is satisfied when the number of times the target object 5 in the moving image (5) weaves in and out of the caution region (M1) within the period of time reaches a threshold number (e.g. three times). The period of time may be constant, or a time it takes for the vehicle 2 to travel a predetermined distance. For example, the processing unit 15 may determine the number of times the target object 5 in the moving image (5) weaves in and out of the caution region (M1) each time the vehicle 2 advances by one kilometer (the predetermined distance). In this embodiment, the processing unit 15 determines that the caution condition is satisfied upon determining the number of times the target object 5 weaves in and out of the caution region (M1) within the period of time reaches the threshold number, and determines that the caution condition not satisfied upon determining that the number of times the target object 5 weaves in and out of the caution region (M1) within the period of time has not yet reached the threshold number. In some variations, the processing unit 15 may calculate a frequency of the target object going in and out of the caution region (M1), and determine that the caution condition is satisfied when the frequency is equal to or greater than a threshold frequency (e.g., 0.5 per second).

In summary, the embodiments of the method for detecting a dangerous driving condition for a vehicle according to this disclosure actively detects zigzag driving by determining whether the caution condition that is related to the number of times the target object weaves in and out of the caution region is satisfied, and outputs the warning notification for notifying the driver of such a dangerous driving condition when the caution condition is satisfied, so as to help prevent accidents.

Any one of the abovementioned embodiments may be realized as a computer program that includes instructions that cause the system 1 to implement the embodiment when executed by the processing unit 15. The computer program may be stored in a non-transitory computer readable medium (e.g., a flash drive, a hard disk drive, a solid state drive, an optical disk, etc.), which may be realized as a physical product or a component of a cloud server.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for detecting a dangerous driving condition for a vehicle, said method being implemented by a system that is mounted to the vehicle and that includes a camera device, a processing unit and a notification device, and comprising steps of:

by the camera device, capturing a moving image of surroundings of the vehicle, wherein the moving image has at least one target object therein;

by the processing unit, defining a caution region in the moving image;

by the processing unit, determining, based on the moving image, whether a number of times the at least one target object in the moving image weaves in and out of the caution region satisfies a caution condition; and by the processing unit, controlling the notification device to output a warning notification that is perceivable to a driver of the vehicle to notify the driver that the vehicle is in a dangerous driving condition when the processing unit determines that the caution condition is satisfied;

wherein, in the step of capturing the moving image, the moving image is captured by the camera device that faces a target side of the vehicle, and the caution region shows a target environment at the target side of the vehicle;

wherein the caution region includes a first sub-region that shows a first area of the target environment, and a second sub-region that shows a second area of the target environment, and the first area is closer to the vehicle than the second area;

wherein the caution condition includes a first condition that is related to a number of times the at least one target object in the moving image weaves in and out of the first sub-region, and a second condition that is related to a number of times the at least one target object in the moving image weaves in and out of the second sub-region; and wherein the caution condition is satisfied when any one of the first condition and the second condition is met.

2. The method of claim 1, further comprising a step of, by the processing unit, determining the caution region in the moving image according to a predefined setting data piece.

3. The method of claim 1, further comprising a step of, by the processing unit, determining the caution region in the moving image based on a plurality of road surface markings in the moving image.

4. The method of claim 1, wherein the caution condition that the number of times the at least one target object in the moving image weaves in and out of the caution region within a period of time reaches a threshold number.

5. The method of claim 1, wherein the first condition includes that the number of times the at least one target object in the moving image weaves in and out of the first sub-region within a predetermined period of time reaches a first threshold number, the second condition includes that the number of times the at least one target object in the moving image weaves in and out of the second sub-region within the predetermined period of time reaches a second threshold number, and the first threshold number is smaller than the second threshold number.

6. The method of claim 1, further comprising a step of, by the processing unit, dynamically adjusting sizes of the first sub-region and the second sub-region based on a speed of the vehicle.

7. The method of claim 6, wherein the processing unit dynamically adjusts the sizes of the first sub-region and the second sub-region by making the size of the first sub-region positively correlated to the speed of the vehicle, and making the size of the second sub-region negatively correlated to the speed of the vehicle.

8. The method of claim 6, wherein the processing unit determines the size of the first sub-region based on a current speed of the vehicle and a response time;

wherein the response time is obtained based on a plurality of previous response time lengths, each of which is an interval between a previous output of the warning notification and an act of braking that was made by the driver of the vehicle in response to the previous output of the warning notification.

9. The method of claim 1, further comprising a step of, by the processing unit, dynamically adjusting sizes of the first sub-region and the second sub-region based on a total number of the at least one target object in the moving image, and the sizes of the first sub-region and the second sub-region are adjusted by making the size of the first sub-region positively correlated to the total number of the at least one target object in the moving image, and making the size of the second sub-region negatively correlated to the total number of the at least one target object in the moving image.

10. The method of claim 1, further comprising:
upon determining that the caution condition is satisfied, by the processing unit, determining whether the satisfaction of the caution condition resulted from movement of the vehicle;
upon determining that the satisfaction of the caution condition resulted from movement of the vehicle, by the processing unit, controlling the notification device to output a perceivable first notification that is the warning notification; and
upon determining that the satisfaction of the caution condition did not result from movement of the vehicle, by the processing unit, controlling the notification device to output a perceivable second notification that is the warning notification and that is different from the perceivable first notification.

11. A system for detecting a dangerous driving condition for a vehicle, comprising:
a camera device to be mounted to the vehicle, and configured to capture a moving image of surroundings of the vehicle, wherein the moving image has at least one target object therein;
a notification device configured to output messages that are perceivable to a driver of the vehicle; and
a processing unit electrically connected to said camera device and said notification device, and configured to define a caution region in the moving image, to determine, based on the moving image, whether a number of times the at least one target object in the moving image weaves in and out of the caution region satisfies a caution condition, and to control said notification device to output a warning notification that is perceivable to the driver of the vehicle to notify the driver that the vehicle is in a dangerous driving condition when said processing unit determines that the caution condition is satisfied;
wherein said camera device faces a target side of the vehicle to capture the moving image, and the caution region shows a target environment at the target side of the vehicle;
wherein the caution region includes a first sub-region that shows a first area of the target environment, and a second sub-region that shows a second area of the target environment, and the first area is closer to the vehicle than the second area;
wherein the caution condition includes a first condition that is related to a number of times the at least one target object in the moving image weaves in and out of the first sub-region, and a second condition that is related to a number of times the at least one target object in the moving image weaves in and out of the second sub-region; and
wherein the caution condition is satisfied when any one of the first condition and the second condition is met.

12. A method for detecting a dangerous driving condition for a vehicle, said method being implemented by a system that is mounted to the vehicle and that includes a camera device, a processing unit and a notification device, and comprising steps of:
by the camera device, capturing a moving image of surroundings of the vehicle, wherein the moving image has at least one target object therein;
by the processing unit, defining a caution region in the moving image;
by the processing unit, determining, based on the moving image, whether a number of times the at least one target object in the moving image weaves in and out of the caution region satisfies a caution condition;
by the processing unit, controlling the notification device to output a warning notification that is perceivable to a driver of the vehicle to notify the driver that the vehicle is in a dangerous driving condition when the processing unit determines that the caution condition is satisfied;
upon determining that the caution condition is satisfied, by the processing unit, determining whether the satisfaction of the caution condition resulted from movement of the vehicle;
upon determining that the satisfaction of the caution condition resulted from movement of the vehicle, by the processing unit, controlling the notification device to output a perceivable first notification that is the warning notification; and
upon determining that the satisfaction of the caution condition did not result from movement of the vehicle, by the processing unit, controlling the notification device to output a perceivable second notification that is the warning notification and that is different from the perceivable first notification.

13. A system for detecting a dangerous driving condition for a vehicle, comprising:
a camera device to be mounted to the vehicle, and configured to capture a moving image of surroundings of the vehicle, wherein the moving image has at least one target object therein;
a notification device configured to output messages that are perceivable to a driver of the vehicle; and
a processing unit electrically connected to said camera device and said notification device, and configured to define a caution region in the moving image, to determine, based on the moving image, whether a number of times the at least one target object in the moving image weaves in and out of the caution region satisfies a caution condition, and to control said notification device to output a warning notification that is perceivable to the driver of the vehicle to notify the driver that the vehicle is in a dangerous driving condition when said processing unit determines that the caution condition is satisfied;
wherein said processing unit is configured to, upon determining that the caution condition is satisfied, determine whether the satisfaction of the caution condition resulted from movement of the vehicle;
wherein said processing unit is configured to, upon determining that the satisfaction of the caution condition resulted from movement of the vehicle, control said notification device to output a perceivable first notification that is the warning notification; and wherein said processing unit is configured to, upon determining that the satisfaction of the caution condition did not result from movement of the vehicle, control said notification device to output a perceivable second notification that is the warning notification and that is different from the perceivable first notification.

\* \* \* \* \*